May 8, 1951    F. V. COLLINS ET AL    2,552,259
ELECTRICAL HEATING ELEMENT
Filed Oct. 12, 1948
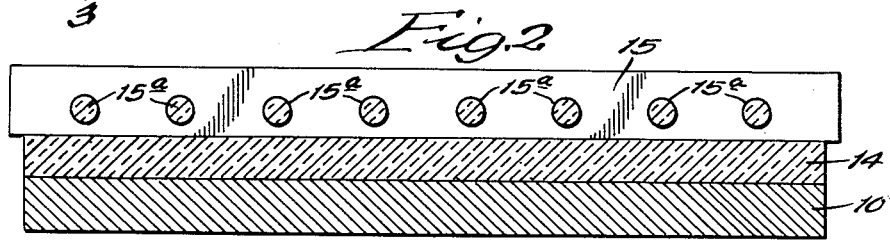
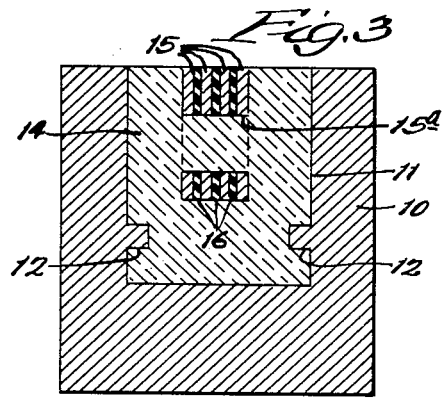
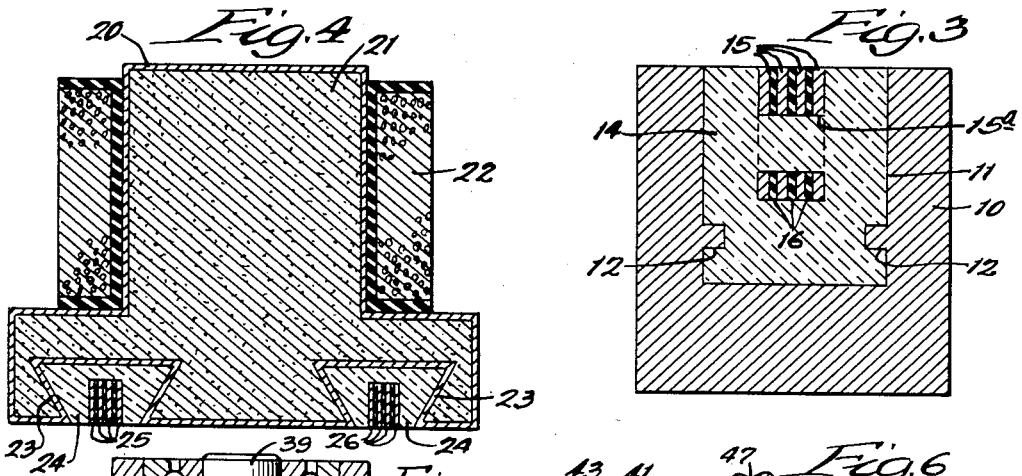
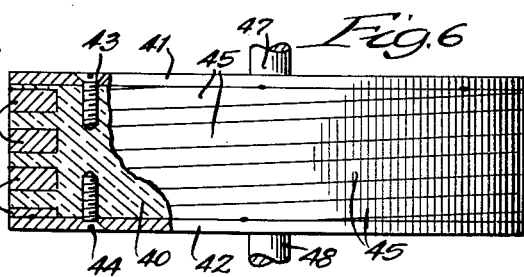
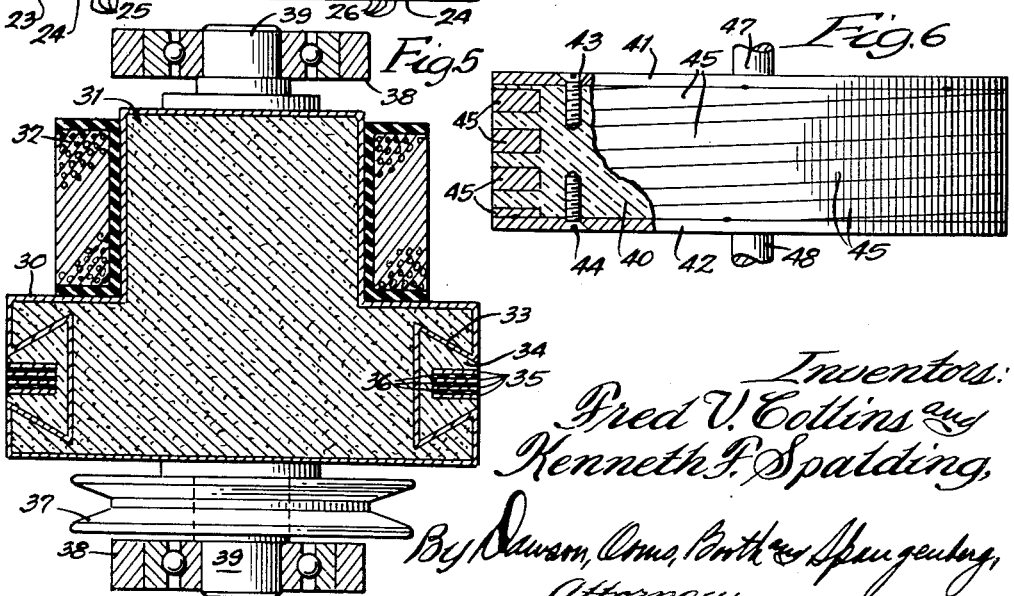
Inventors:
Fred V. Collins and
Kenneth F. Spalding,
By Dawson, Ormsby, Porth and Spangenberg,
Attorneys.

Patented May 8, 1951

2,552,259

UNITED STATES PATENT OFFICE 2,552,259

ELECTRICAL HEATING ELEMENT

Fred V. Collins, Des Plaines, and Kenneth F. Spalding, Chicago, Ill., assignors to William F. Stahl, Kenilworth, Ill.

Application October 12, 1948, Serial No. 54,082

6 Claims. (Cl. 219—19)

This invention relates to an electrical heating element particularly adapted for use in the sealing of plastics; it is especially suited for use in connection with the method of and apparatus for sealing plastics disclosed and claimed by us in our co-pending application, Serial No. 48,458.

In that co-pending application, we have described the sealing together of plastic sheets by confining them under mechanical pressure between sealing bars having an electrical resistance element adapted, when carrying current, to transmit heat to the portion of the plastic sheets thus confined. In our method and apparatus therein described, we pass current through the resistance element and thereby raise the temperature of the plastic sheets only after they have been confined between the sealing bars; that is, the temperature of the sealing bars is normally maintained below the fusion temperature of the plastics to be sealed.

Our present invention constitutes a greatly improved sealing-bar structure which offers great superiority in mechanical and electrical properties over former heating elements available for the sealing of plastics.

An object of our present invention is to provide an electrical heating element in which one or more resistance strips are confined within a rigid, non-metallic binder, thus preventing buckling of the resistance element when heated.

Another object of our invention is to provide an electrical heating element, suitable for use in the sealing of plastics, wherein an electrical resistance strip is confined within a rigid binder and presented edgewise to the object to be heated thereby.

A further object of our invention is to provide a sealing bar adapted for use in the sealing of plastics by impulse heating wherein electrical resistance elements are rigidly confined and positioned to supply heat along narrow longitudinal strips in the smooth surface of the bar adapted to abut a plastic sheet to be sealed.

Still another object of our invention is to provide a sealing bar having electrical resistance elements adapted to provide heat around the periphery of any desired closed path without the necessity for external electrical connections to the resistance elements.

Other objects and advantages of our invention will appear as the specification proceeds.

The invention is illustrated, in several embodiments, by the accompanying drawings, of which Figure 1 is a plan view of a straight sealing bar adapted for use in sealing together plastic sheets; Fig. 2 is a side view in section of the sealing bar shown in Fig. 1, the section being taken along line 2—2 in Fig. 1; Fig. 3 is a transverse view in cross section of the Fig. 1 embodiment of our invention, the section being taken along the line 3—3 in Fig. 1; Fig. 4 is a sectional view of another embodiment of our invention, showing a sealing bar adapted to form circular seals; Fig. 5 is a sectional view of another modification of our invention, being a sealing bar adapted to form a continuous straight seal in a pair of plastic sheets fed continuously past the sealing bar; and Fig. 6 is a view in side elevation, partly in section, of still another modification of our invention.

As shown in Figs. 1, 2, and 3, our straight sealing bar comprises a main supporting frame 10 which may be formed of steel or other suitable material. Frame 10 is elongated and rectangular in outline, and along its upper surface it contains a longitudinal recess 11, extending from one end of frame 10 to the other. Near the bottom of recess 11, and extending inwardly from its side walls, are a pair of flanges or projections 12, formed integrally with frame 10.

A plurality of electrical resistance strips 15, which may be formed of nichrome or other suitable resistance material, are positioned side by side in parallel relationship and are separated one from another by strip separators 16, which may be formed of mica or other material capable of withstanding high temperatures.

A plurality of apertures 15a are provided in each of the strips 15 and the separators 16, said apertures 15a being located in corresponding positions on the various resistance strips and separators, so that when the resistance strips and separators are assembled the apertures 15a register. Thus they provide a plurality of holes which pass entirely through the assembled electrical heating element comprising strips 15 and separators 16.

The heating element comprising strips 15 and separators 16 is suspended within a molded body of mica-silica insulation 14. The insulation body 14 comprises an integral body which encases the resistance element, passes entirely through each of the holes 15a, and entirely fills recess 11, being secured in position therewithin by flange projections 12.

To facilitate electrical connection thereto, the resistance strips 15 are extended at each end of the sealing bar slightly beyond the end surfaces of frame 10 and insulation body 14. It will be understood that this construction is optional, and any other convenient means of providing electrical contact to the resistance elements 15 may be used.

The structure just described has extremely great mechanical rigidity, and it confines the resistance strips so securely that they cannot buckle or shift their position even when heated to a high temperature.

The structure just described may most readily be formed by the use of a mold adapted to receive frame 10 and to support at its outer ends the electrical heating element comprising the resistance strips 15 and separators 16. When the frame and the resistance element are thus held in proper relative position, the mica-silica insulating material, in a molten state, may be poured into recess 11. It will flow freely while at high temperature and thus form the integral binder illustrated in the drawings. As it cools, the mica-silica insulating material will harden to form a very strong and hard supporting body for the electrical heating element. Normally, in constructing a sealing bar according to our invention, it is best that the top surface of the bar, including the upper surfaces of frame 10, insulating body 14, resistance strips 15, and separators 16, be machined to a uniform smooth surface after the insulating body 14 has set.

It will be understood that flange members 12 are merely illustrative of a suitable technique for securely binding the insulating body 14 within the frame 10. Other means of rigidly associating the frame and the insulating body may be employed.

The embodiment of our invention which is illustrated in Fig. 4 is a sealing device adapted for making continuous, closed-perimeter seals in plastic sheets. Such seals are frequently desirable when plastic sheets are used for packaging small objects such as powder puffs or greeting cards. Such seals may likewise be useful in packaging food products within plastic containers, as, for example, in packaging meat patties.

In forming such a seal, it is important that the seal be continuous and free from any breaks or irregularities, since in most cases it is important that no air space be left to admit dirt or impurities. A complete, unbroken seal is particularly important in the packaging of food products, since admission of air through any gap in the seal might cause the contents of the container to spoil.

Fig. 4 shows a sealing member adapted to produce, by the electrical impulse heating technique described in our co-pending application, Serial No. 48,458, such a continuous, unbroken seal. The sealing element shown in Fig. 4 is intended to cooperate with a corresponding member having a recess for accommodating during the sealing operation the object to be enclosed in the sealed container. Suitable apparatus, such as that disclosed in our aforesaid co-pending application, might provide means for bringing together the cooperating sealing members, to press together the plastic sheets surrounding the object to be sealed.

Sealing could thereupon be accomplished by applying electrical current to the member illustrated in Fig. 4.

That sealing element embodies a main casing stamped or otherwise formed from thin metal, preferably a non-ferrous metal. In the figure this casing is shown in cross section. On the lower face of casing 20 an annular recess 23 is provided. As shown in the figure, recess 23 has a rather restricted opening, the walls being slanted away from the opening to provide a substantially greater area at the bottom of the recess than at the opening.

While, for purposes of illustration, the recess 23 is herein shown as generally circular in shape, such as might be appropriate for making a container to enclose a powder puff, it will be understood that the recess, and the resistance heating element therein, may be given any shape that may be desired, according to the use to which the apparatus is to be put.

Within recess 23 an electrical heating element, comprising a plurality of resistance strips 25 and strip separators 26, is rigidly supported within a body of mica-silica insulation, just as in the Fig. 1 embodiment of our invention. Since, in the Fig. 4 embodiment, a continuous, closed-perimeter seal is to be formed, the various resistance strips 25 form continuous, concentric rings. A plurality of holes through the sides of the resistance heating element, similar to those denoted 15a in Fig. 1, may be employed to permit free flow of the molten mica-silica compound through the heating element, as was herein described with respect to the first embodiment of the invention.

As was hereinbefore stated, casing 20 is formed of relatively thin metal, and the hollow interior of casing 20 may be entirely filled with powdered iron 21. Around the upper portion of casing 20 a coil of wire 22 is provided, the electrical characteristics thereof being suited to the particular alternating-current power source available.

It may be seen from an examination of Fig. 4 that the structure therein illustrated will, when alternating current is passed through coil 22, function as a transformer, the secondary coil thereof being the single-turn electrical resistance element formed by resistance strips 25. Thus, when a current passes through coil 22, a heavy, low-voltage current will be induced in electrical resistance elements 25, and as a result the heating element will rise in temperature to any value desired.

By the use of the structure shown in Fig. 4, it is accordingly possible to provide a seal which will be entirely continuous, since no connecting wires need be applied to resistance elements 25 and those elements thus need have no beginning or end portions.

The embodiment of Fig. 5 is closely related to that of Fig. 4, but is adapted to provide a continuous straight-line seal for the special cases wherein adjoined sheets of plastic are swept past the sealing machine by a continuous flow process.

The Fig. 5 embodiment has a thin metallic casing 30, and a powdered iron filler 31, as with the Fig. 4 form of the invention. A recess 33 is provided on the lower rim of casing 30, and a heating element comprising a plurality of resistance strips is embedded in mica-silica insulation material just as in the Fig. 4 embodiment. As will be noted from the figure, this heating element is positioned to form a continuous heated strip around the rim of casing 30 rather than on the flat under-surface as in Fig. 4.

The casing 30 is supported on an axle 39 which is journalled into a pair of anti-friction bearings 38, and a pulley 37 is mounted on axle 39 to permit rotation of casing 30 by a belt coupled to a motor.

A primary coil 32 is supported around the shank of casing 30, as in the Fig. 4 embodiment; in this form of the invention, however, coil 32 is preferably independently supported so that casing 30 can rotate within the core of coil 32.

As may be seen, this form of the invention is particularly well adapted for use on a continuous-feed machine, since the plastic sheets may be drawn along between the Fig. 5 sealing member and a cooperating roller. No slip-rings or other means of the sort need be used to carry electrical current to the heating element, since the heating element forms a single-turn secondary coil and current for heating the same will be induced therein when current is passed through the stationary primary coil 32.

Fig. 6 shows a modification of our invention which is also adapted for use on a continuous-feed machine. It comprises a body 40, formed in the shape of a disc and made of mica-silica insulation or other material capable of withstanding high temperatures. A spiral groove is cut in the outer cylindrical surface of body member 40 and within said spiral groove a single, continuous strip 45 of nichrome or other resistance material is tightly wound edgewise. The terminals of resistance element 45 are secured respectively to a pair of metallic end-plates 41 and 42, which are fixed to the top and bottom of disc-shaped body member 40. Plates 41 and 42 may be secured to the body member 40 by any suitable means, such as by a plurality of screws 43 and 44. Screws 43 and 44 should be countersunk so that their heads are flush with or slightly below the surface plates 41 and 42, so as to permit a sliding contact free passage over the surface of each plate. Along the axis of disc member 40 a pair of axles 47 and 48 may be provided to support the sealing member in suitable bearings (not shown). It is of course essential that there be no short-circuit between the plates 41 and 42; accordingly, axles 47 and 48 may be threaded into plates 41 and 42 respectively, or any other means for mounting the axles may be used which does not involve a continuous metallic contact between the respective plates 41 and 42.

In the operation of this form of the invention, a pair of sliding contacts should be provided for cooperation with the plates 41 and 42, so that as the sealing element is rotated during the continuous-feed process electrical current can flow through the resistance element 45 and thus transmit heat for sealing to the plastic sheets pressed into contact with the perimeter of disc member 40.

While we have, in this specification, described certain embodiments of our invention in considerable detail for the purposes of illustration, it will be understood that those skilled in the art may make many variations thereon and many changes in details without departing from the spirit of our invention.

We claim:

1. A heating element comprising a length of electrically-conducting resistance ribbon embedded edgewise in a body of heat-resistant, substantially rigid, molded insulating material, the outer edges of said ribbon being substantially flush with the surface of said material, said ribbon having holes in the sides thereof through which said insulating material passes to hold said ribbon secure against buckling.

2. A heating element comprising a plurality of electrically-conducting resistance ribbons disposed in symmetrical relation to one another and embedded edgewise in a body of heat-resistant, substantially rigid, molded insulating material, the outer edges of said ribbons being substantially flush with the surface of said material, said ribbons containing holes through which said insulating material passes to hold said ribbons secure against buckling.

3. A heating element comprising a plurality of electrically-conducting resistance ribbons disposed in parallel relation to one another and embedded edgewise in a body of heat-resistant, substantially rigid, molded insulating material, the outer edges of said ribbons being substantially flush with the surface of said material, said ribbons containing holes through which said insulating material passes to hold said ribbons secure against buckling.

4. A heating element adapted for heat-sealing of plastics comprising a metallic frame, a body of heat-resistant molded insulating material secured within the frame, and an electrically-conducting resistance ribbon embedded edgewise within said body, the outer edge of said ribbon being substantially flush with the surface of said material, said ribbon containing holes through which said insulating material passes to hold said ribbon secure against buckling.

5. A heating element comprising a continuous, endless length of electrically conducting resistance ribbon embedded edgewise in a body of heat-resistant, substantially rigid, molded insulating material, the outer edge of said ribbon being substantially flush with the surface of said material, said ribbon having holes in the sides thereof through which said insulating material passes to hold said ribbon secure against buckling.

6. A heating element comprising a plurality of continuous, endless, electrically conducting resistance ribbons disposed in concentric relation to one another and embedded edgewise in a body of heat-resistant, substantially rigid, molded insulating material, the outer edges of said ribbons being substantially flush with the surface of said material, said ribbons containing holes through which said insulating material passes to hold said ribbons secure against buckling.

FRED V. COLLINS.
KENNETH F. SPALDING.

REFERENCES CITED

The following references are of record in the file of this patent:

UNITED STATES PATENTS

| Number | Name | Date |
|---|---|---|
| 1,624,029 | Whitcomb | Apr. 12, 1927 |
| 1,954,061 | Smith | Apr. 10, 1934 |